(12) United States Patent
Aoki et al.

(10) Patent No.: US 7,197,442 B2
(45) Date of Patent: Mar. 27, 2007

(54) MESH CREATING DEVICE, MESH CREATING METHOD AND MESH CREATING PROGRAM

(75) Inventors: Kenichiro Aoki, Kawasaki (JP); Koichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 528 days.

(21) Appl. No.: 10/641,006

(22) Filed: Aug. 15, 2003

(65) Prior Publication Data
US 2004/0044507 A1 Mar. 4, 2004

(30) Foreign Application Priority Data
Aug. 30, 2002 (JP) ............................. 2002-254041

(51) Int. Cl.
*G06F 17/10* (2006.01)
(52) U.S. Cl. ......................................................... 703/2
(58) Field of Classification Search ................ 345/200; 700/128, 98; 715/964; 703/2
See application file for complete search history.

(56) References Cited

U.S. PATENT DOCUMENTS

| 4,912,664 A | * | 3/1990 | Weiss et al. .................. 716/20 |
| 5,553,206 A | * | 9/1996 | Meshkat ...................... 345/423 |

FOREIGN PATENT DOCUMENTS

| JP | 04-032975 | 2/1992 |
| JP | 07-254003 | 10/1995 |
| JP | 11-007548 | 1/1999 |
| JP | 2002-183223 | 6/2002 |

OTHER PUBLICATIONS

John R. Baker "Ansys Exercise Temperature Distribution in a Turbine Blade with Cooling Channels", Feb. 6, 2002 http://web.archive.org/web/20020206124755/http://www.engr.uky.edu/~jrbake01/ansys-heatxfer2.doc.*
Dr. A. Yoxall, "Ansys Tutorial Mech 315", University of Sheffield Department of Mechanical Engineering, Feb. 2001.*
Ariel Shamir et al., "Multi-Resolution Dynamic Meshes with Arbitrary Deformations",IEEE Visualization Conference 2000, Oct. 2000, pp. 423-431.*

* cited by examiner

Primary Examiner—Hugh Jones
(74) Attorney, Agent, or Firm—Staas & Halsey LLP (57) ABSTRACT

Herein disclosed is a mesh creating device, a mesh creating method and a mesh creating program which are adapted to speed up the analysis processing without deteriorating analysis accuracy and to effectively facilitate an handling of the data after creation of the analysis model. The mesh creating device is capable of creating an analysis mesh for the data of a construction composed of a plurality of objects, and comprised of: a first mesh creating specification setting section adapted to set attributes to which said plurality of objects belong respectively and set mesh creating specifications for the respective attributes; and a mesh creating section adapted to conduct mesh creations according to the set mesh creating specifications.

18 Claims, 6 Drawing Sheets

| MATERIAL NAME | DIVISION | REMOVAL (ENABLE / DISABLE) | GROUP NUMBER |
|---|---|---|---|
| MATERIAL A | ☐ | ☐ ☐ | ☐ |
| MATERIAL B | ☐ | ☐ ☐ | |
| MATERIAL C | ✓ (41a) [80] (41b) | ☐ (44a) ☐ (44b) | [4] |

40 — 41 — 44 — 46

Tabs: TOTAL / CLASS / MATERIAL / HEATING / USER'S OPTION

Fig. 5

| HEATING ELEMENT NAME | DIVISION | REMOVAL (ENABLE / DISABLE) | GROUP NUMBER |
|---|---|---|---|
| HEATING ELEMENT A | ✓ [100] | ☐ ✓ | [5] |
| HEATING ELEMENT B | ✓ [200] | ☐ ✓ | [6] |
| | 51a  51b | 54a  54b | |

50 — 51 — 54 — 56

Tabs: TOTAL / CLASS / MATERIAL / HEATING / USER'S OPTION

Fig. 6

| TOTAL | CLASS | MATERIAL | HEATING | USER'S OPTION |

| PART NAME | DIVISION | REMOVAL | GROUP NUMBER |
|---|---|---|---|
| PART A | ✓  120 | ☐ | 7 |
| PART B | | | |
| PART C | | | |
| 60 | 61 | 64 | 66 |

ADDITION OF PARTS AS DESIRED

MESH CREATING DEVICE, MESH CREATING METHOD AND MESH CREATING PROGRAM

BACKGROUND OF THE INVENTION

1. Field of the Invention

The present invention relates to a mesh creating device, a mesh creating method and a mesh creating program which are suitable for use in execution of a heat and/or fluid analysis simulation using a calculating model for a device composed of a plurality of kinds of parts.

2. Description of the Related Art

Recently, it is often performed in a computer to simulate a physical movement of a device model that is designed by employing CAD (computer-aided design) in order to verify the model. For example, an analysis such as a thermal conduction analysis, a fluid analysis, a structural analysis, an electromagnetic field analysis, and electromagnetic analysis and the like is generally performed by employing the finite volume method and/or finite element method in which a mesh is formed in a analyzing field, as a result of which a plurality of objects divided by such a mesh are analyzed. In this case, it is performed to remove parts which are each regarded as unimportance in view of the analysis in order to converge the analysis result and to reduce an analysis period of time.

In Japanese Patent Laid-Open Publication No. 2002-183223 for example, there is disclosed a mesh creation for a construction such as electrical appliance wherein a plurality of objects corresponding respectively to a plurality of parts constituting the electrical appliance are handled as an analysis object. According to this publication, a heat flux is calculated as importance in the respective analysis simulations of the plurality of objects by using information regarding a plurality of kinds of attributes (attribute information) inclusive of coordinate information of the plurality of objects so that parts which have been decided to be of low importance based on the calculated heat flux values are removed and then a mesh for an analysis is created for the construction except the removed objects.

This conventional mesh creation for the construction composed of the plurality of parts is performed by using a division specification defined constantly regardless of attributes of the respective parts. For this reason, when the respective analysis simulations of the plurality of parts are performed, parts which are regarded as importance in the analysis (each part should essentially be finely analyzed) and parts which are not regarded as importance (each part is not need to be finely analyzed) are divided on the same level so that it is difficult to catch balance between improvement in analysis accuracy and speeding-up of analysis processing. Specifically, in order to improve the analysis accuracy, parts which are not regarded as importance will be finely analyzed so that futile analysis processing operations are increased to obstruct the speeding-up of analysis. Furthermore, when a mesh is created for a construction composed of a plurality of parts, a predetermined processing thereof is performed regardless of attributes of the respective parts. After the mesh creation, all of the parts are handled as the same class without discrimination of the physical properties thereof. Therefore, it often happens that inconveniences are caused in handling an analysis model after mesh creation processing. For example, it is inconveniently impossible to reproduce an assembly state captured before creation of its analysis model.

Accordingly, an object of the present invention is to provide a mesh creating device, a mesh creating method and a mesh creating program which are adapted to speed up an analysis processing without deteriorating analysis accuracy. Also, another object of the present invention is to provide a mesh creating device, a mesh creating method and a mesh creating program which are adapted to facilitate an handling of data after an analysis model of an object to be analyzed.

SUMMARY OF THE INVENTION

In order to address the above-mentioned problem and the other, the present invention has been accomplished. According to an aspect of the present invention, there is provided a mesh creating device adapted to create a mesh for use in analysis for data of an construction composed of a plurality of objects. The mesh creating device capable of creating an analysis mesh for the data of a construction composed of a plurality of objects, comprising:

a first mesh creating specification setting section adapted to set attributes to which the plurality of objects belong respectively and set mesh creating specifications for the respective attributes; and a mesh creating section adapted to conduct mesh creations according to the set mesh creating specifications.

With this configuration, it is possible to create a mesh according to the mesh specification which is adapted for an attribute of the object, thereby speeding up the analysis processing without deteriorating the analysis accuracy.

Here, parts of the construction are exemplified as objects in the following embodiments and the objects include an analysis object such as an air space formed within the construction.

Further, it is possible to include in the attributes attribute category information which designates categories of the attributes and attribute discriminative information which designates discriminations among the attributes. For example, the attribute category information may include at least one of class, material, heating element and object name (article name). On the other hand, the attribute discriminative information may include information representative of one material of a plurality of materials, information representative of one class of a plurality of classes and information representative of a kind of one of heating elements.

In the mesh creating device, the mesh creating specification includes the number of division for each object belonging to one attribute of a plurality of attributes. With this configuration, it is possible to finely or coarsely divide an object depending on its attribute. As a result, a portion which is important in analysis of the object can densely be calculated but a portion which is not important in analysis of the object can roughly be calculated, thereby efficiently speeding-up the analysis processing without deteriorating analysis accuracy.

Also, in the mesh creating device, the mesh creating specification includes removal enable/disable information for the object belonging to the attribute.

Also, the mesh creating device further comprises a priority order setting section adapted to set a priority order of a mesh creating specification every group divided on attribute-by-attribute basis based on the set mesh creating specifications, as a result of which the mesh creating section can conduct mesh creations based on the set mesh creating specifications according to the set priority order thereof. With this configuration, it is possible to conduct the mesh creations according to the set priority orders thereof (or to conduct a mesh creation based on a mesh creating specification having the highest priority order) in the event that an object (part) belongs to a plurality of attributes and that different mesh creating specifications are set for those attributes.

Also in this case, the priority order setting section can set the priority orders based on the mesh creating specifications. For example, the priority order of a mesh creating specification set for an attribute by which the number of division should be set larger can be set higher than that of a mesh creating specification for an attribute by which the number of division should be set smaller. With this configuration, the division of an object will be conducted with the largest number of division among those set for a plurality of attributes to which the object belongs, thereby conveniently maintaining the number of division for an object which is very important in analysis and then leading to a high reliability.

Furthermore, the mesh creating device further comprises a second mesh creating specification setting section which is adapted to set a mesh creating specification for the plurality of objects in total regardless of the attributes to which the plurality of objects belong. With this configuration, a mesh creation for all of parts (objects) constituting the construction can be conducted without defining some attributes to which all of parts belong.

According to another aspect of the present invention, there is provided a mesh creating method of creating a mesh for use in analysis for the data of a construction composed of a plurality of objects, comprising the steps of:

(a) setting attributes to which the plurality of objects belong respectively and setting mesh creating specifications for the respective attributes; and (b) conducting mesh creations according to the set mesh creating specifications.

Also, the mesh creating method further comprises (c) setting a priority order of a mesh creating specification every group divided on attribute-by-attribute basis based on the mesh creating specifications set in the previous step (a), wherein, in the previous step (b), the mesh creations are conducted according to the priority orders set in the previous step (c).

According to yet another aspect of the present invention, there is provided a mesh creating program for causing a computer to execute a mesh creation processing to create a mesh for use in analysis, comprising the steps of:

(a) setting attributes to which a plurality of objects belong respectively and setting mesh creating specifications for the respective attributes; and (b) conducting mesh creations according to the set mesh creating specifications.

This mesh creating program can be stored in a computer readable storage medium which comprises a portable storage medium such as a CD-ROM, a flexible disk (FD), a DVD disk, an opto-magnetic disk, an IC card and the like, or a database storing computer programs.

Also, in the mesh creating program, the attribute includes attribute category information which designates category of the attribute and attribute discriminative information which designates discriminations within the attribute. The attribute category includes at least one of class, material, heating element and object name. The mesh creating specification includes the number of division for an object belonging to an attribute.

Also, in the mesh creating program, the mesh creating specification further includes removal enable/disable information of the object belonging to the attribute. Moreover, the mesh creating program is characterized by further comprising (c) setting the priority order of the mesh creating specification every group divided on attribute-by-attribute basis, wherein, in the previous step (b), the mesh creations are conducted based on the mesh creating specifications according to the priority orders set in the previous step (c). In particular, the priority order is set based on the mesh creating specification in the previous step (c). Also in the previous step (c), the priority order is set higher as the number of division becomes larger. Furthermore, the mesh creating program is characterized by further comprising a second step of setting a mesh creating specification for the plurality of objects in total regardless of the attributes to which the plurality of objects belong.

These and other aspects of the present invention will be apparent from the following specific description, given by way of example, with reference to the accompanying drawings.

DESCRIPTION OF PREFERRED EMBODIMENTS

Hereinafter, preferred embodiments of the present invention will be described in detail with reference to the accompanying drawings.

Figure 1:
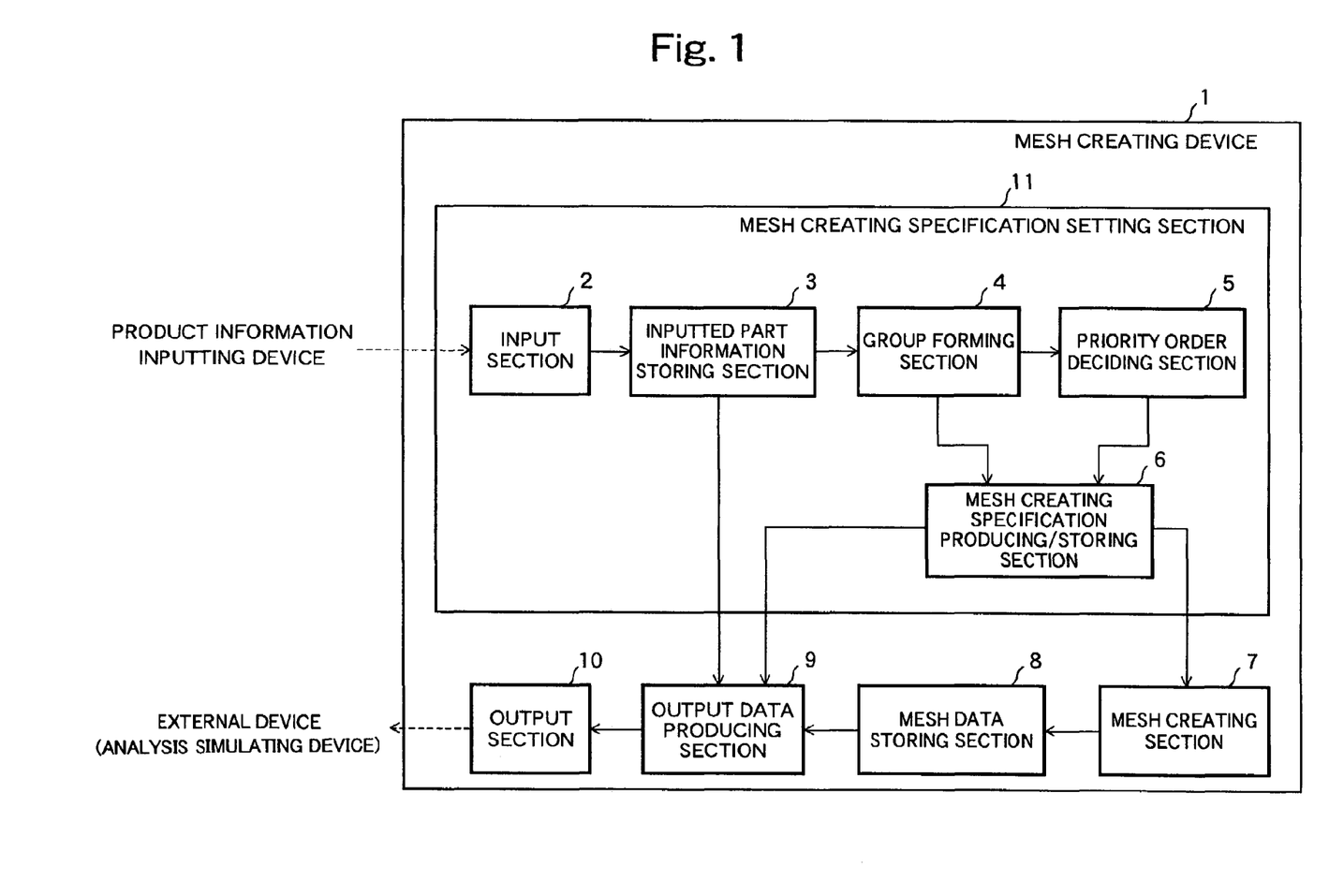
FIG. 1 is a schematic block diagram showing a mesh creating device according to a preferred embodiment of the present invention.

FIG. 1 is a schematic block diagram showing a mesh creating device according to a preferred embodiment of the present invention. The mesh creating device 1 comprises: an input section 2 for inputting part (as an object and which may include an air space) information from product information device; inputted part information storing section 3 for storing therein the inputted part information outputted from the input section 2; a group forming section 4 for setting a group of parts every attribute based on the inputted part information and setting a division specification every group (or every attribute); a priority order deciding section 5 for deciding a priority order of a division specification for a part included in each of the groups every group; a mesh creating information producing/storing section 6 for producing and storing information suitable for creating a mesh so as to perform a removal or division of the part according to the mesh creating specification and based on the groups and the priority orders; a mesh creating section 7 for removing a part to be removed according to this mesh creating information and for creating a mesh suitable for performing the division of a part; a mesh data storing section 8 for storing therein mesh data created by the mesh creating section 7; output data producing section 9 for producing output data suitable for outputting the mesh data thus created above; and an output section 10 for outputting the output data. The output data outputted from the output section 10 is sent as analysis model data to an analysis simulating device and a display device.

The part information from the input section 2 includes attribute information such as a parts name, a parts class, a physical property value (material), an existence of heating (a part being a heating element or non-heating element) and a user option, as well as a parts ID and its shape data. In addition to the class and the physical properties as attribute categories, the attribute information may include discriminative information in each attribute category (e.g., materials A and B). The group forming section 4 is adapted to group inputted parts every attribute. At that time, a part may belong to a plurality of attributes. For each of parts which are grouped, a mesh creating specification is provided with a setting input for the possibility as to whether such a part should be removed every group or with a setting input for the number of division. The setting input of this mesh creating specification may initially be given as part information or may be inputted directly from the group forming section 4. In the event that a plurality of mesh creating specifications are set for a part belonging to a plurality of groups, the priority order deciding section 5 decides priority order about which one of the mesh creating specifications set for the part should priorly be handled.

In the above configuration, the input section 2, the inputted part information storing section 3, the group forming section 4, the priority order deciding section 5 and the mesh creating information producing/storing section 6 constitute a mesh creating specification setting section 11 according to the present invention.

Figure 2:
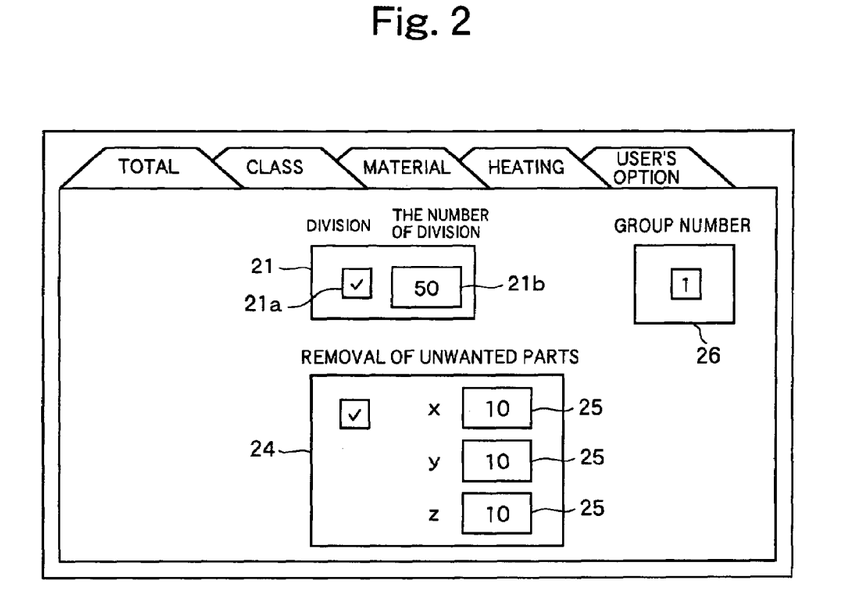
FIG. 2 is a schematic view showing a setting screen (total designation screen) prepared for a mesh creating specification.

The following description is provided to explain an operation of a method for setting a mesh creating specification with reference to FIGS. 2 to 6. In association with a plurality of parts (analysis construction) in total, FIG. 2 is a schematic view showing a setting screen (total designation screen) prepared for the mesh creating specification and adapted to designate and set the number of division and the removal of parts. In the total designation screen, the necessity or nonnecessity of division and the number of division in the case of the necessity thereof are inputted and set in a division setting section 21. In an example as shown in FIG. 2, the necessity of division is checked by a check mark in a division designation box 21a and the number of division (50) is designated in a divisional number designation box 21b. Further, there is provided in the total designation screen a removal setting section 24 for unwanted parts. In this example, the necessity of a part as an object to be removed is designated by a check mark and a size of its removed object is inputted and designated in a size designation box 25. In this example, it would be appreciated that a part having a size less than 10 mm in x, y, z directions is shown as an object to be removed. Furthermore, a group of mesh creating specifications set in this total designation screen is indicated in a group number indication box 26 as a group number "1".

Figure 3:
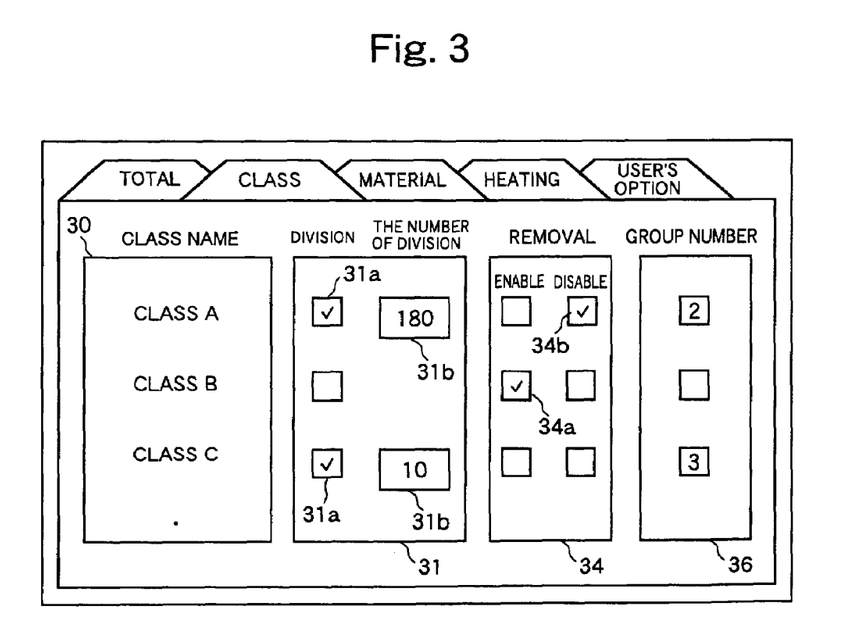
FIG. 3 is a schematic view showing a setting screen prepared for classes as attribute information.

In association with parts belonging to the attribute of classes, FIG. 3 is a schematic view showing a setting screen prepared for classes as attribute information and adapted to set a mesh creating specification for a group of parts every class and to set a group number thereof. In a class setting screen as shown in FIG. 3, there are provided a class name designation box 30 by which class names (A, B, C, . . . ) are designated and a division designation section 31 by which, every class name, the necessity or nonnecessity of the division and the number of division in the case of the necessity thereof are designated. In an example as shown in FIG. 3, the necessity of the division is checked by a check mark in a division designation box 31a and the number of division is designated in a divisional number designation box 31b.

Furthermore, a removal setting section 34 adapted to designate the possibility of removal is provided in this setting screen. In the case of removal, a removal enable box 34a is checked by a check mark, but a removal disable box 34b is check by a check mark in the case of non-removal. Also, a group number indication box 36 is provided therein in which a group number for a group of parts every class is indicated. In this example, the class name "B" is a removal object and therefore its group number is not indicated in the group number indication box 36. Also, in this example, the class "A" is set in the number of division with larger in numbers than those for the other classes and "disable" for its removal in the removal setting section 34 because the class "A" requires a more detailed calculation in thermal analysis. However, the class "B" is a removal object because its existence has no influence on such a thermal analysis. Also, the class "C" is not so large in influence and therefore is set with small in numbers for the number of division. With respect to the removal, parts of the class "C" follows conditions set in connection with the other attributes for the same parts or conditions set in the total designation screen.

Figure 4:
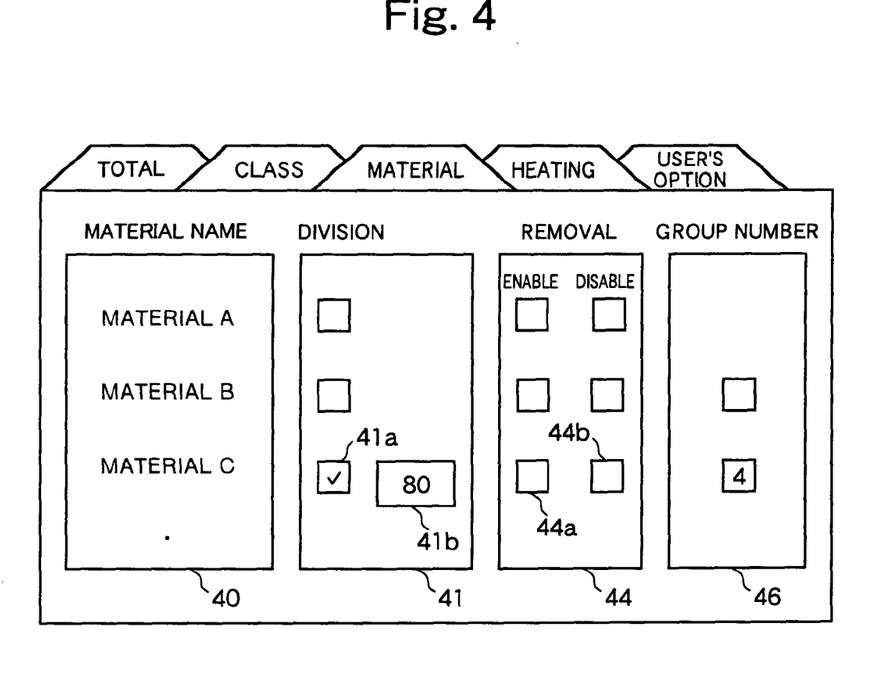
FIG. 4 is a schematic view showing a setting screen prepared for materials as attribute information.

In association with parts belonging to the attribute of materials, FIG. 4 is a schematic view showing a setting screen prepared for materials as attribute information and adapted to set a mesh creating specification for a group of parts every material and to set a group number thereof. In the setting screen prepared for materials as shown in FIG. 4, there is provided a material name designation box 40 for setting material names (A, B, C, . . . ). In a division designation section 41, the necessity or nonnecessity of the division and the number of division in the case of the necessity thereof are set every material name. In an example as shown in FIG. 4, the necessity of the division is checked by a check mark in a division designation box 41a and the number of division is designated in a divisional number designation box 41b. Furthermore, a removal setting section 44 adapted to designate the possibility of removal is provided in this setting screen. In the case of removal, a removal enable box 44a is checked by a check mark, but a removal disable box 44b is check by a check mark in the case of non-removal. Also, a group number indication box 46 is provided therein in which a group name for a group of parts every class name is indicated. In this example, only the group name "C" is an object to be divided. Also, in this example, there is no designation in the removal setting section 44 and the possibility of removal of such parts is decided in dependence on a higher one of priority orders set in the total designation screen and set for the other attributes.

Figure 5:
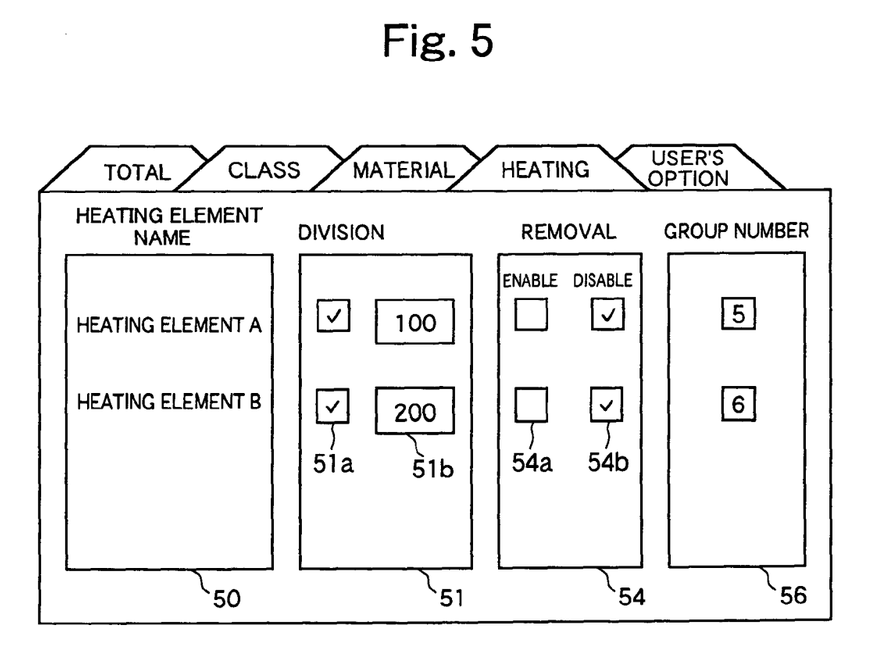
FIG. 5 is a schematic view showing a setting screen prepared for the necessity and nonnecessity of heating as attribute information.

In association with parts belonging to the attribute of heating elements, FIG. 5 is a schematic view showing a setting screen prepared for the necessity and nonnecessity of heating as attribute information and adapted to set a mesh creating specification for a group of parts every heating element and to set a group number thereof. In the setting screen prepared for heating elements as shown in FIG. 5, there is provided a heating element-name designation box 50 for setting heating element names (A, B). In a division designation section 51, the necessity or nonnecessity of the division and the number of division in the case of the necessity thereof are set every heating element name indicated in the heating element-name designation box 50. In an example as shown in FIG. 5, the necessity of the division is checked by a check mark in a division designation box 51*a* and the number of division is designated in a divisional number designation box 51*b*. Furthermore, a removal setting section 54 for designating the possibility of removal is provided in this setting screen. In the case of removal, a removal enable box 54*a* is checked by a check mark, but a removal disable box 54*b* is check by a check mark in the case of non-removal. Also, a group number indication box 56 is provided therein in which a group name for a group of parts every class name is indicated. In this example, since the heating element is an important part in thermal analysis, the number of division is set with large in numbers and the "disable" for removal is set. In particular, the heating element "B" is larger in influence on the thermal analysis than that of the heating element "A". Therefore, the heating element "B" is set in the number of division with larger in numbers than those for the heating element "A".

Figure 6:
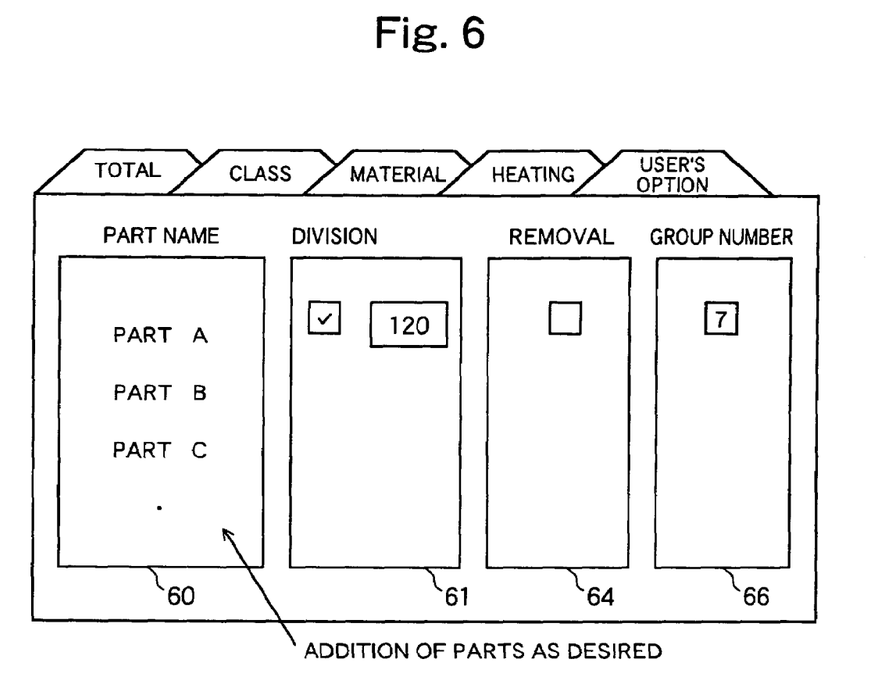
FIG. 6 is a schematic view showing a setting screen prepared for user's options as attribute information.

In association with selection of a part name as the attribute of user's options, FIG. 6 is a schematic view showing a setting screen prepared for user's options as attribute information and adapted to set a mesh creating specification for a group of parts every part name and to set a group number thereof. In a part-name setting screen (an user's option setting screen) as shown in FIG. 6, there is provided a part-name designation box 60 for setting part names (A, B, C, . . . ). In a division designation section 61, the necessity or nonnecessity of the division and the number of division in the case of the necessity thereof are set every part name designated in the part-name designation box 60. Furthermore, a removal setting section 64 for designating the possibility of removal is provided in this setting screen. As well as the part name (parts B, parts C, . . . ), the names of class, group and the like involved in the respective attributes as described above (attribute categories) may be added to this setting screen as desired. Correspondingly, the division designation box and the divisional number designation box can be increased in numbers in the division setting section 61.

Figure 7:
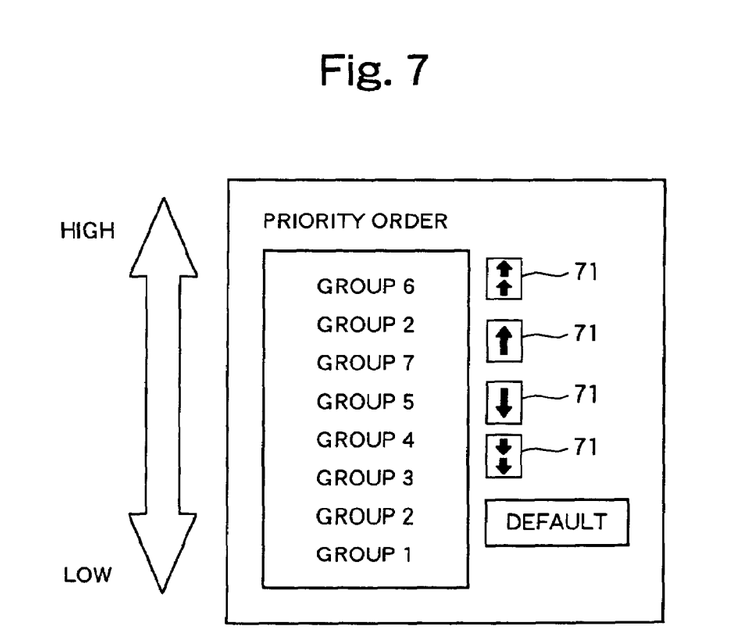
FIG. 7 is a schematic view showing a setting screen for priority order.

In the event that a part has a plurality of group numbers set every attribute as described above, FIG. 7 is a schematic view showing a setting screen for deciding the priority order about which one of the group numbers should priorly be selected such that the mesh specification set for its selected group number is executed. In this example as shown in FIG. 7, the smaller the number of division, the lower priority order is set (the larger the number of division, the higher priority order is set.). Also, the priority order for the mesh creating specification set the general setting screen is set at the lowest order. However, the priority order can optionally be set by the user in a manner that, after selection of a group number as an object, its priority order can be varied by an operation button 71.

Figure 8:
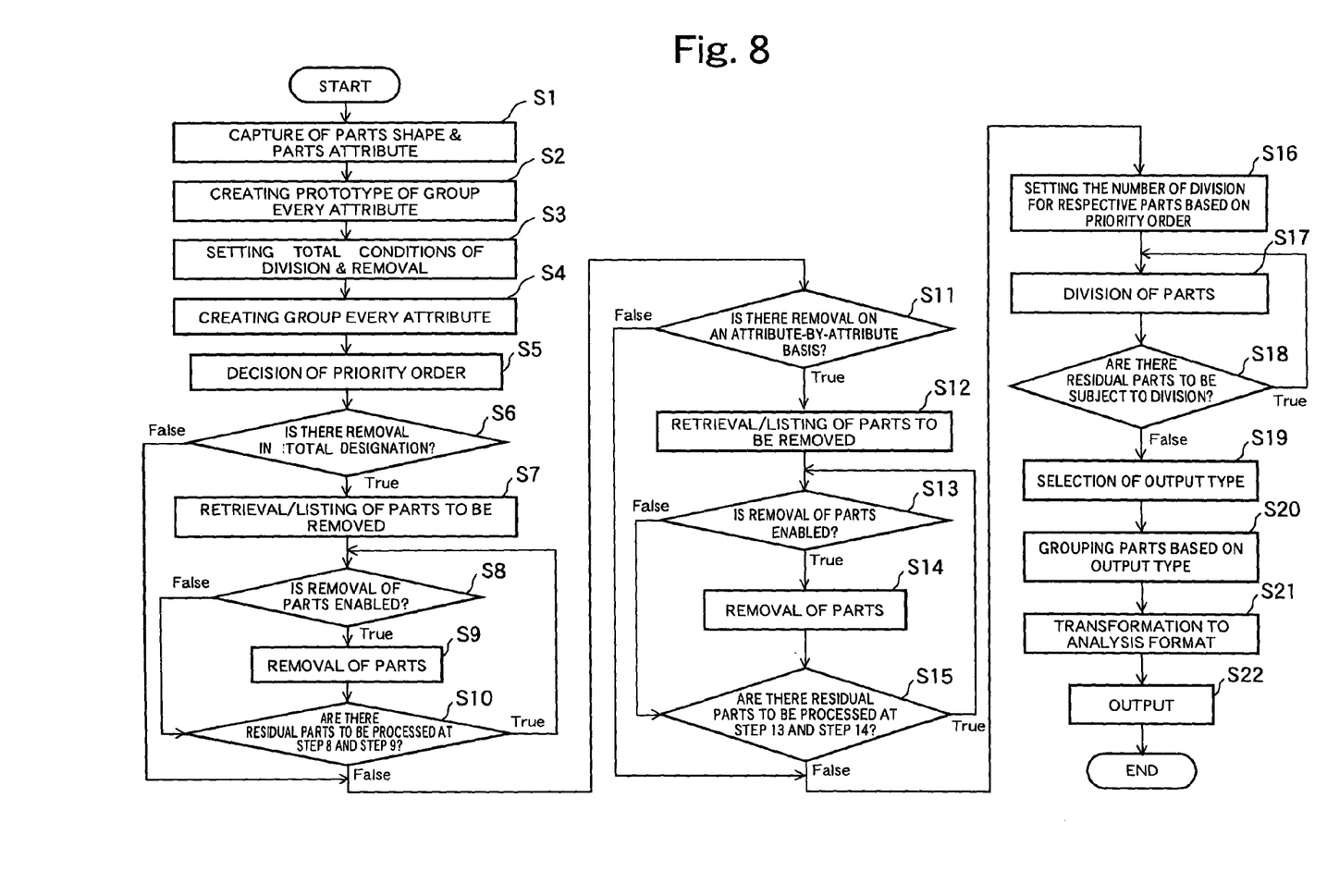
FIG. 8 is a flow chart showing an entire operation of the preferred embodiment of the present invention.

FIG. 8 is a flow chart showing an entire operation of the preferred embodiment of the present invention. First of all, shapes and attributes of parts are captured (S1) to create a prototype of a group every attribute (class, material etc.) (S2). Then, a mesh creating specification (conditions of division and removal) for all of components, inclusive of parts, constituting a construction is set on the total setting screen as shown in FIG. 2 (S3). By using the prototype created in the step of S2, a creation of group is executed every attribute as shown in FIGS. 3 through 6 (setting of a mesh creating specification every attribute) (S4). Then, the priority orders for the created groups are decided or set as shown in FIG. 7, thereby ending setting of the mesh creating specification.

Subsequently, a removal processing of parts to be removed or removal parts is executed before the creation of a mesh according to the mesh creating specification. In the step of S6, it is decided if there is any removal parts designated on the total setting screen. In the case that the removal parts are present (S6: True), a retrieval of the removal parts is executed and all of the retrieved parts are listed (S7). Then, it is decided whether the retrieved parts are designated as removal disable parts under the other attributes. In the case that the retrieved parts are found to be removal enable parts (S8: True), the removal thereof is executed (S9). These processing steps (S8 and S9) are executed on all of the retrieved parts as listed above (S10). After execution of such a general or total removal or in the case of non-necessity thereof (S6: False), the control flow proceeds to step S11 wherein it is decided if there are any removal parts on an attribute-by-attribute basis as set in FIGS. 3 through 6 (S11). In the case that the removal parts are present, a retrieval of the removal parts is executed and all of the retrieved parts are listed (S12). If the retrieved parts are found to be removal enable parts (S13 : True) as a similar manner to the step of S8 in connection with the other attributes, the removal thereof is executed (S14) and the processing steps (S13 and S14) are executed on all of the retrieved parts as listed above (S15).

Figure 9:
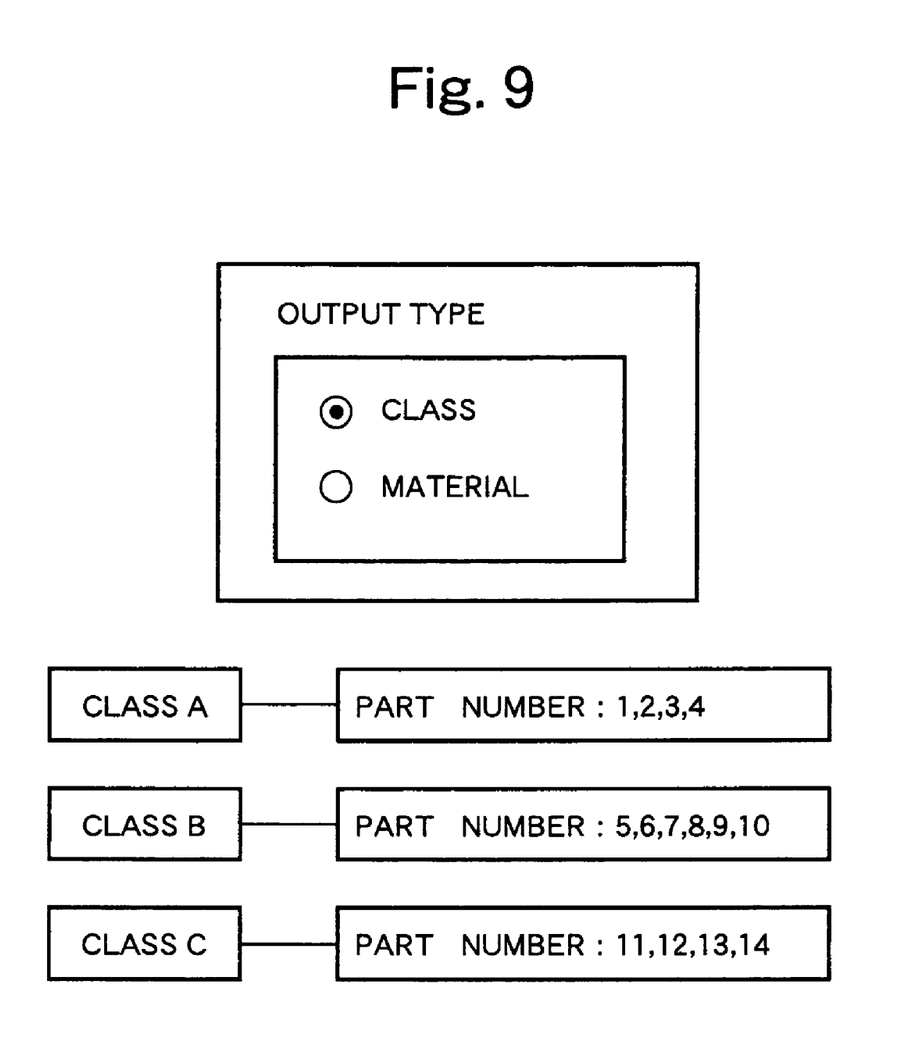
FIG. 9 is an example of output mode according to the preferred embodiment of the present invention.

In this way, the removal of all of parts to be removed are completed. Thereafter the number of division based on the priority order is allocated to each of parts in step of S16. Then, all of parts are each divided according to the number of division (a mesh creation) (S17 and S18). After that divisional processing, an output type is selected (S19) and then the parts are grouped as desired (S20). The resultant data is duly transformed into an analysis format suitable for the analysis simulating device in consideration of the attribute information (such as material or the like) (S21) and outputted (S22). FIG. 9 is an example of output mode according to an output type. For example, the class is selected as output type and then a part number per class (attribute discrimination) is outputted and displayed. Thus, an assembly state of the construction can readily be reproduced from the data for the analysis model, thereby providing a convenience to a user in handling thereof.

According to the present invention, it is possible to speed up the analysis processing without deteriorating analysis accuracy. Also, it is possible to provide a mesh creating device, a mesh creating method and a mesh creating program which are adapted to effectively facilitate an handling of the data after creation of the analysis model.

While preferred exemplary embodiments of the present invention have been described above, it is to be understood that further adaptations of the invention described herein can be obtained by appropriate modifications by one of ordinary skill in the art without departing from the scope of the present invention. Accordingly, although preferred configurations of devices, methods, and programs embodying the present invention have been described, it should be understood that these devices, methods, and programs may take on a wide variety of configurations and arrangements without departing from the scope of the present invention. Therefore, the scope of the present invention should be considered in terms of the following claims and should not be limited to the details of the devices, methods, and programs shown and described above.

What is claimed is:

1. A mesh creating device capable of creating a mesh for use in analysis for data of a construction composed of a plurality of objects, comprising:

a first mesh creating specification setting section adapted to set attributes to which said plurality of objects belong respectively and to set mesh creating specifications for the respective attributes;

a mesh creating section adapted to conduct mesh creations according to the set mesh creating specifications; and a group priority order setter to group on an object attribute-by-attribute basis the set mesh creating specifications for the respective object attributes and to set a priority order of a mesh creating specification for every group divided on an attribute-by-attribute basis based on said set mesh creating specifications for the respective object attributes, wherein said mesh creating section creates the meshes based on said set mesh creating specifications for the respective object attributes according to said set priority orders thereof.

2. A mesh creating device as claimed in claim 1, wherein said attributes include attribute category information which designates category of an attribute and attribute discriminative information which designates discriminations within said attribute.

3. A mesh creating device as claimed in claim 2, wherein said attribute category includes at least one of class, material, heating element and object name.

4. A mesh creating device as claimed in claim 1, wherein said set mesh creating specifications for the respective object attributes include a number of division for each object belonging to one attribute among a plurality of attributes.

5. A mesh creating device as claimed in claim 1, wherein said set mesh creating specifications for the respective object attributes include removal enable/disable information for an object belonging to an attribute among a plurality of the object attributes.

6. A mesh creating device as claim in claim 1, wherein said priority order setting section sets said priority based on said mesh creating specifications for the respective object attributes.

7. A mesh creating device as claimed in claim 6, wherein said priority order setting section sets the priority order higher as a number of division for an object becomes larger.

8. A mesh creating device as claimed in claim 1, further comprising a second mesh creating specification setting section which is adapted to set a mesh creating specification for said plurality of objects in total regardless of said attributes to which said plurality of objects belong.

9. A mesh creating method of creating a mesh for use in analysis for data of a construction composed of a plurality of objects, comprising:

setting attributes to which said plurality of objects belong respectively;

setting mesh creating specifications for the respective object attributes;

conducting mesh creations according to said set mesh creating specifications;

grouping on an object attribute-by-attribute basis the set mesh creating specifications for the respective object attributes; and setting a priority order of a mesh creating specification for every group divided on an attribute-by-attribute basis based on said mesh creating specifications for the respective object attributes, wherein said mesh creations are conducted according to said set priority orders of the mesh creating specifications for the respective object attributes.

10. A computer readable recording medium storing at least one mesh creating program for causing a computer to create a mesh for use in analysis according to a process comprising:

setting attributes to which a plurality of objects belong respectively;

setting mesh creating specifications for the respective object attributes;

conducting mesh creations according to said set mesh creating specifications for the respective object attributes;

grouping on an object attribute-by-attribute basis the set mesh creating specifications for the respective object attributes; and setting a priority order of a mesh creating specification for every group divided on attribute-by-attribute basis, wherein said mesh creations are conducted based on said set mesh creating specifications for the respective object attributes according to said set priority orders.

11. The medium as claimed in claim 10, wherein said attributes include attribute category information which designates category of an attribute and attribute discriminative information which designates discriminations within said attribute.

12. The medium as claimed in claim 11, wherein said attribute category includes at least one of class, material, heating element and object name.

13. The medium as claimed in claim 10, wherein said set mesh creating specifications for the respective object attributes include a number of division for an object belonging to an attribute.

14. The medium as claimed in claim 10, wherein said mesh creating specifications for the respective object attributes include removal enable/disable information of an object belonging to an attribute among a plurality of object attributes.

15. The medium as claimed in claim 10, wherein said priority order is set based on said mesh creating specifications for the respective object attributes.

16. The medium as claimed in claim 15, wherein said priority order is set higher as a number of division for an object becomes larger.

17. The medium as claimed in claim 10, wherein the process of the program further comprises setting a mesh creating specification for said plurality of objects in total regardless of said attributes to which said plurality of objects belong.

18. An apparatus creating a mesh for use in analysis for data of a construction composed of a plurality of objects, comprising:

means for setting attributes to which said plurality of objects belong;

means for setting mesh creating specifications for the attributes;

means for creating a mesh according to the set mesh creating specifications;

means for grouping on an object attribute-by-attribute basis the set mesh creating specifications for the object attributes; and means for setting a priority order of a mesh creating specification for every group divided on an attribute-by-attribute basis based on said set mesh creating specifications for the object attributes, wherein said means for creating the mesh creates the mesh based on said set mesh creating specifications for the object attributes according to said set priority orders thereof.

* * * * *